A. R. KELLER.
MASH AND STRAINER TANK MACHINE.
APPLICATION FILED MAR. 15, 1916.
1,213,381.
Patented Jan. 23, 1917.
4 SHEETS—SHEET 2.
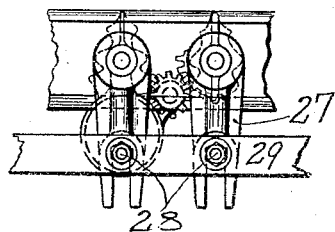
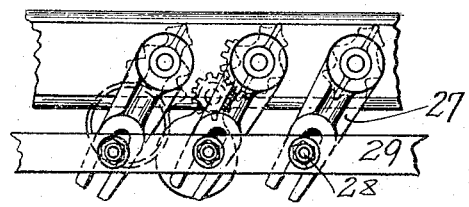
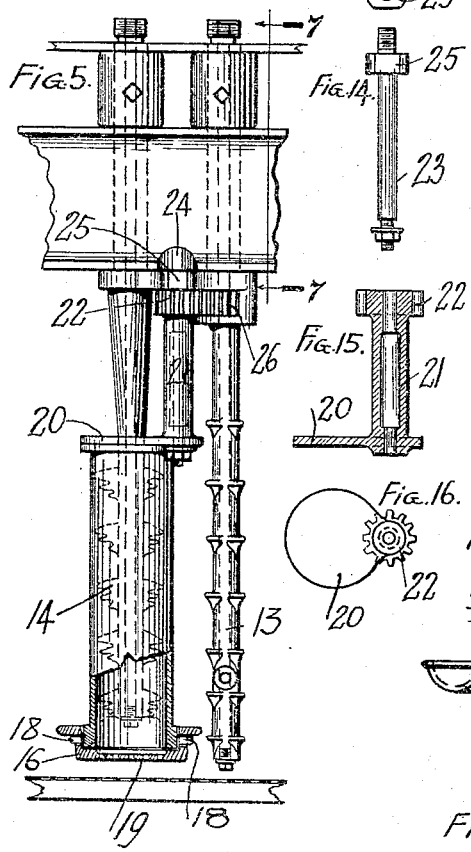
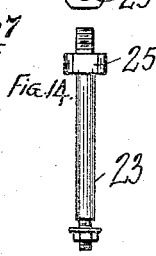
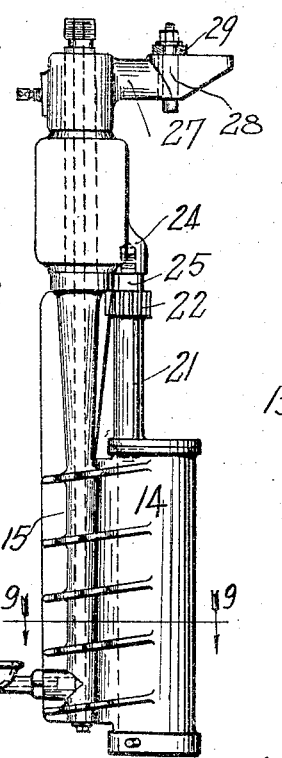
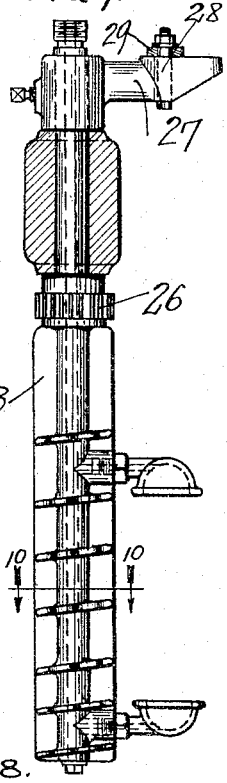
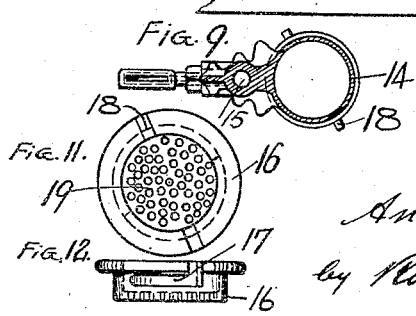
WITNESS
A. J. Ebner
INVENTOR:
Andreas R. Keller
by Ross M Crog ATTY.

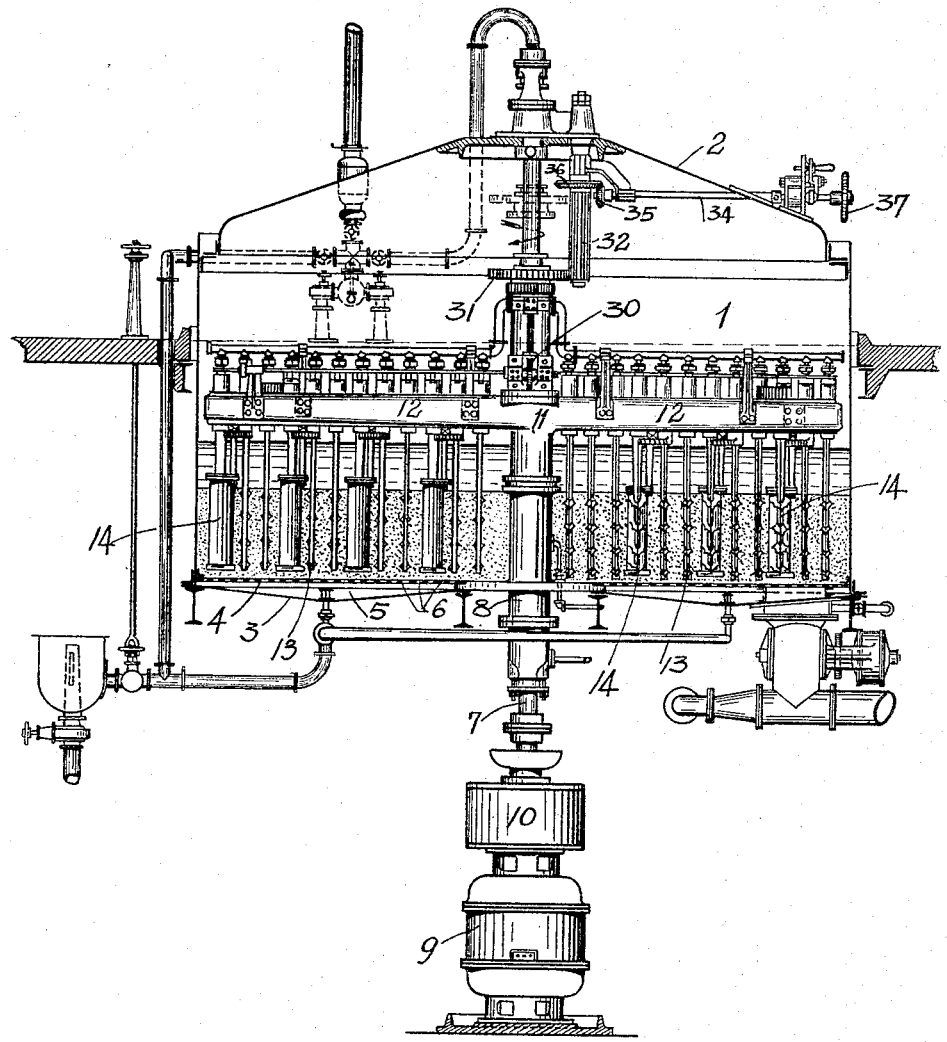
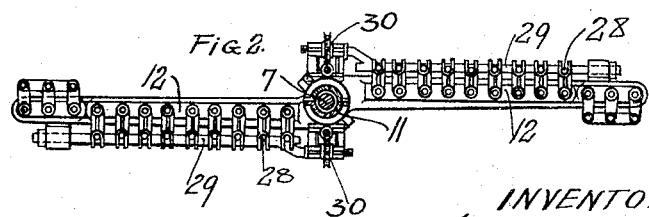

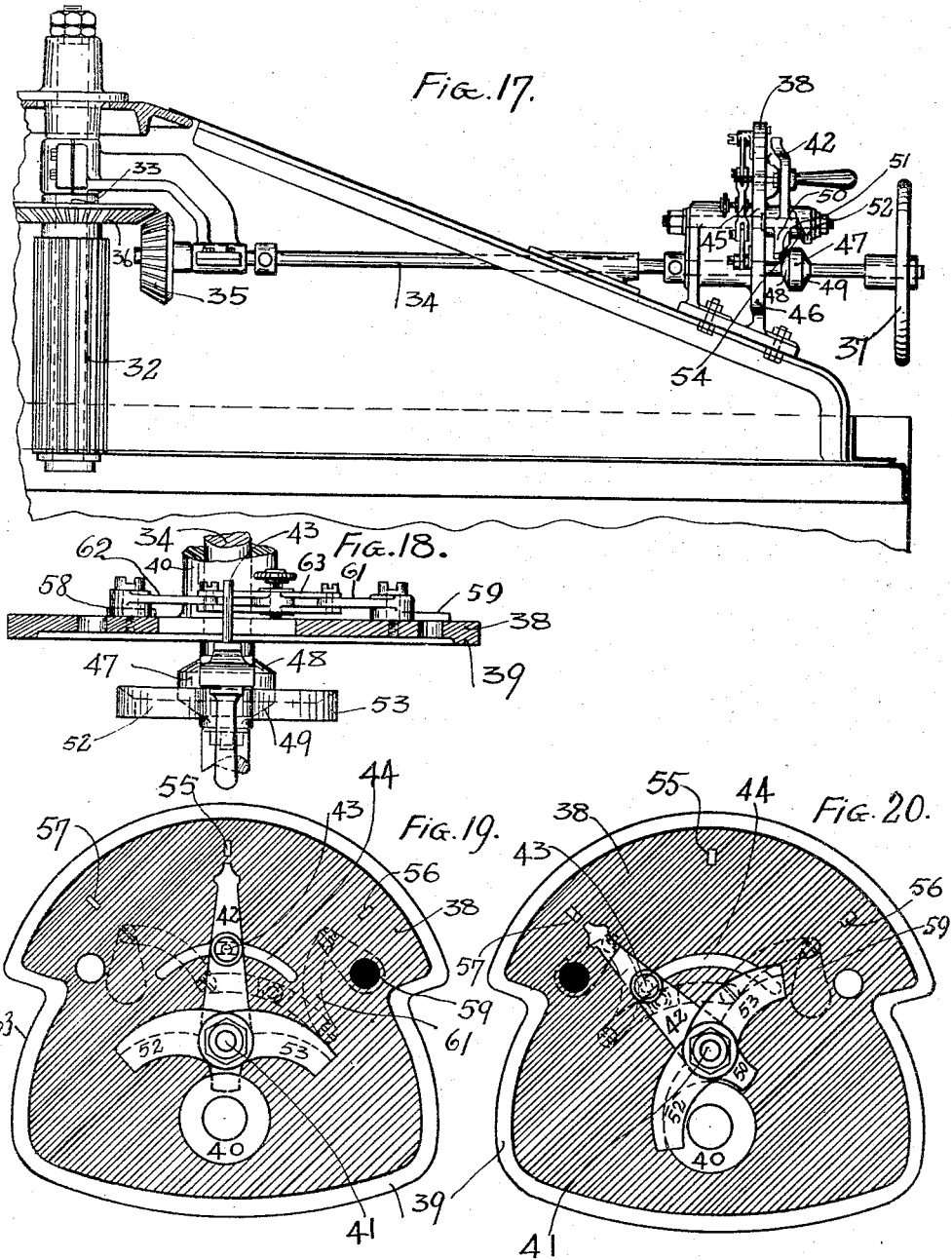

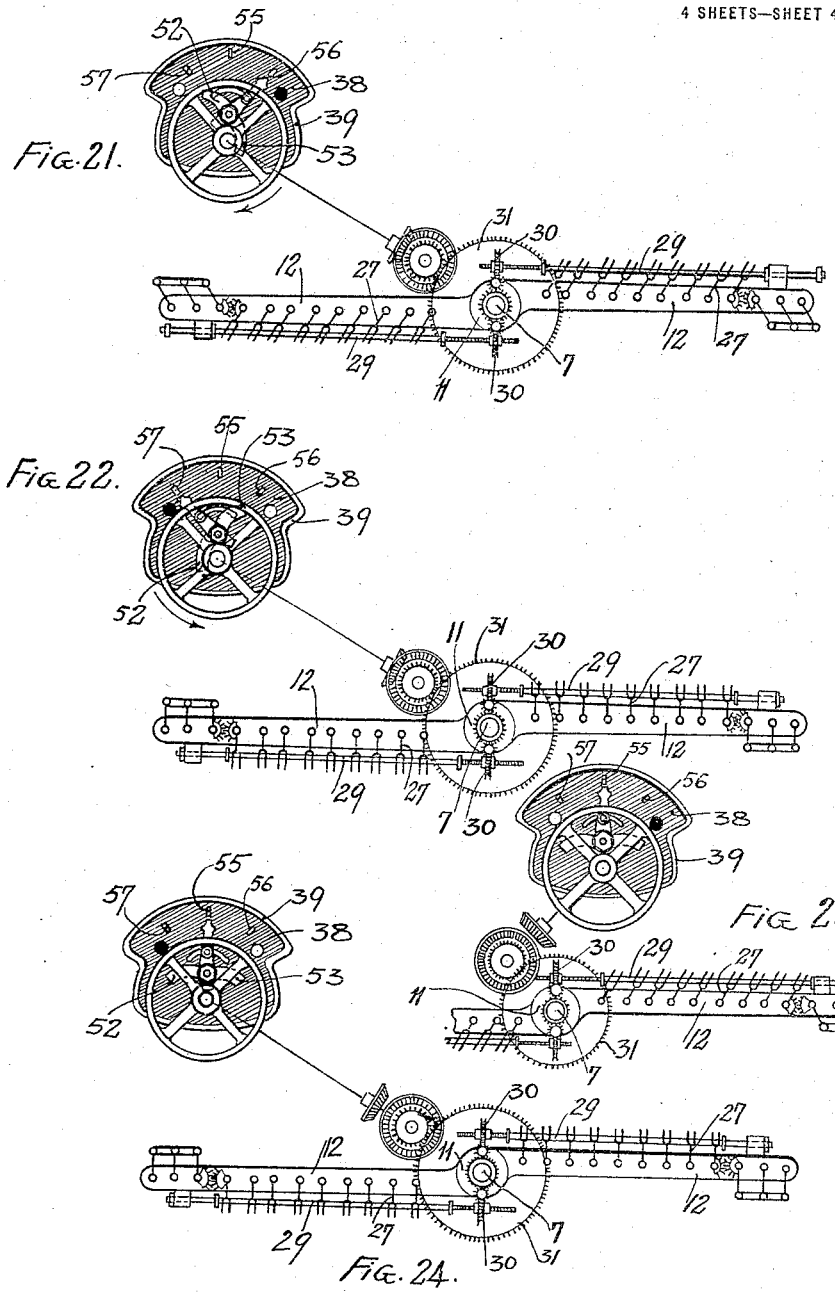

UNITED STATES PATENT OFFICE.

ANDREAS R. KELLER, OF CHICAGO, ILLINOIS.

MASH AND STRAINER TANK MACHINE.

1,213,381.   Specification of Letters Patent.   Patented Jan. 23, 1917.

Application filed March 15, 1916. Serial No. 84,346.

*To all whom it may concern:*

Be it known that I, ANDREAS REINHARD KELLER, a citizen of the United States, residing at 1215 Twenty-first avenue, in Melrose Park, a suburb of the city of Chicago, in the county of Cook and State of Illinois, have invented certain new and useful Improvements in Mash and Strainer Tank Machines, of which the following is a specification.

This invention relates to new and useful improvements in mash and strainer tank machines and is particularly designed as an improvement upon the machine shown and described in Letters Patent No. 1,166,599, granted to me January 4th, 1916.

Primarily the features of the present invention reside in the novel construction of the strainer mechanism, the means for adjusting the said strainer mechanism and the mechanism for controlling said adjustment which is so located and arranged that the adjusted position of the strainers and agitators may be instantly ascertained from the exterior of the tank, and may be quickly and conveniently altered when desired.

Among the objects are to increase the efficient operation of this type of machine by rendering the operations of mixing, cooking, straining and drawing off more reliable and rapid, to make provision for quickly and conveniently controlling the adjustment of the strainer mechanism from the exterior of the tank or tun, and to so arrange the machine and the parts thereof that they are readily and easily accessible for cleansing, repairing and replacement. I accomplish these and other objects as hereinafter described in the following specification and as particularly pointed out in the appended claims, reference being had to the accompanying drawings, forming a part of this application in which an embodiment of the improved machine and the parts thereof are shown.

A brief description of the figures in the drawings accompanying and forming a part of this application which consists of four sheets is as follows:—

Figure 1, is a central vertical section through my improved tank with the interior operating parts in side elevation, and also showing the motor, speed reducing mechanism and various exterior mechanisms in side elevation. Fig. 2, is a top elevation of the strainer mechanism detached from the machine. Fig. 3 is an enlarged fragmentary detail view of one of the strainer arms with the strainer mechanism in a closed or mashing position. Fig. 4, is an enlarged fragmentary detail view of one of the strainer arms with the strainer mechanism in an open or straining position. Fig. 5, is a side elevation of the fragment shown in Fig. 3, with the parts closed and in mashing position, similar to Fig. 3. Fig. 6, is an elevation of the fragment of the mechanism shown in Fig. 5 looking at right angles to said Fig. 5. Fig. 7, is a section on line 7—7 Fig. 5, also showing the lower parts thereof in elevation. Fig. 8, is an enlarged detail of the double bottom. Fig. 9, is a transverse section on line 9—9 Fig. 6, through one of the strainer tubes. Fig. 10, is a transverse section on line 10—10, Fig. 7. Fig. 11, is an enlarged detached plan view of the removable perforated bottom of one of the strainer tubes. Fig. 12, is an enlarged detached side elevation of the removable perforated bottom of one of the strainer tubes. Fig. 13, is an enlarged detached plan view of one of the oblong nuts. Fig. 14, is an enlarged detached side elevation of the stationary pin and oblong nut. Fig. 15, is an enlarged central longitudinal section through one of the tubular supporting sleeves for the strainer tube cover. Fig. 16, is a plan view of the tubular cover supporting sleeve shown in Fig. 15. Fig. 17, is an enlarged fragmentary detail of the controller also showing its connecting shaft and gearing. Fig. 18, is an enlarged fragmentary top plan of the controller with parts thereof also partly shown in section. Fig. 19, is an enlarged detail front elevation of the controller lever and its supporting plate and component parts with the lever in a central or neutral position. Fig. 20, is an enlarged detail front elevation of the controller lever and its supporting plate and component parts with the lever shifted to one side. Figs. 21, 22, 23, and 24 are diagrammatic views of the strainer mechanism, the controller and the connecting gearing to illustrate the different positions of these elements.

My present improved machine is of the vertical tank type, having a tank or tun within which the agitators are located and revolve about a central vertical shaft, and being provided with various inlet and outlet pipes for the material, steam, water, etc., an operating motor and an adjusting and controlling mechanism for the strainer mechanism arranged in a convenient exterior position for easy manipulation.

In referring to the drawings in detail, like numerals indicate corresponding parts in the several views thereof.

The tank or tun 1, of the apparatus is generally of an upright cylindrical form and is provided with an upwardly dished top 2, and a bottom 3. A false bottom 4 is arranged above the bottom being separated slightly to leave an intervening space 5, and is provided with a series of perforations 6. This it will be noted provides a double bottom for the tank. A main shaft 7, extends centrally and vertically through the tank and a vertical inclosing casing 8, fits around the said shaft 7 and has its lower portion depending through the double bottom of the tank. The shaft 7 is rotated from a suitable motor 9, through an intermediate set of speed reducing gears 10, located vertically over the motor and connected to the lower extremity of said shaft. An agitator frame supported within the tank has a central sleeve 11, which is fitted around and keyed to the shaft with its lower end resting upon and supported by the casing 8.

The upper portion of the shaft 7, is made tubular as shown in Fig. 3 of my Patent No. 1,166,539, for the purpose explained in said patent to which reference is to be made for the details thereof. As this construction forms no part of my present invention, no further mention will be made herein.

Besides the central sleeve 11, the agitator frame comprises two horizontal arms 12 which extend nearly oppositely from said sleeve being slightly offset as shown in Fig. 2. A series of blade agitators 13 are hung pendant from each arm and as shown in Fig. 1, these agitators are generally arranged in pairs and between each pair is arranged a tubular strainer tube 14, which is attached to one side of pendant blade 15, and offset therefrom, see Figs. 5, 6 and 7. The lower end of each tube is closed by a removable flanged bottom plate, 16, which is secured thereto by what I term a bayonet lock, the flanges of the plate being provided with oppositely located angular slots 17, and the tube end having oppositely projecting lateral pins 18, which slide and lock in the slots 17. The bottom plate 16, is provided with straining perforations 19, and any plate may be easily removed or replaced by giving it a partial turn in the proper direction. The top mouth of each tube 14, is closed by a swinging cover 20, which is provided with a vertical tubular supporting sleeve or arm 21 projecting upward from one side edge thereof and carrying a spur gear wheel 22, at its upper extremity, see Figs. 5, 6, 7, 15 and 16. The cover is supported by a vertical bolt, 23, (see Fig. 14), which fits through the tubular sleeve or arm, 21 and through a lateral lug 24 on the frame arm and is secured in place by an oblong nut 25, shown in Fig. 13. The covers 20, are swung to cover or uncover the tubes by means of gear wheel 26, mounted on adjacent agitators which mesh with the gear wheels 22.

Although in Fig. 1 the strainer tubes are shown each alternated between two pairs of the blade agitators it is obvious that they may be differently arranged if desired.

Each of the agitators has a crank 27, at its upper extremity which is provided with a bifurcated outer end which straddles a projecting pin 28, on an adjustment bar 29. Two bars 29, are provided which extend parallel to and on opposite sides of the frame arms and each bar is shifted longitudinally to swing or turn all of the agitators connected thereto by worm and bevel gearing 30, which in turn is operated through a spur gear wheel 31, which meshes with a barrel gear 32, arranged on a short vertical supplementary shaft 33, arranged on one side of the main shaft, in the upper portion of the tank. The shaft, 33 is rotated or partially rotated to shift the agitators by a horizontal shaft 34, which is journaled in the tank top as shown more particularly in Fig. 17 and has a bevel gear 35, at its inner end which meshes with a bevel gear wheel 36, on the shaft, 33 when in operating position and a hand wheel 37, at its outer extremity. The shaft 34, is shifted longitudinally to move the gear wheel 36 into and out of meshing position with respect to the bevel gear wheel 35, by means of a controlling mechanism which is mounted on the top of the tank in proximity to the hand wheel.

As shown in Figs. 17 to 20 the controlling mechanism comprises an upright dial or indicating plate 38, having an irregular curved marginal flange 39. The plate 38, is provided with a bearing 40, through which the horizontal shaft 34 passes, and a second bearing vertically above the bearing 40, in which a short rock shaft 41, is journaled on which an indicator hand 42 is mounted. The indicator hand 42 is provided with a pin 43, at an intermediate point which projects and slides in a curved slot 44, in the plate and thus limits the turning movement thereof. The dial is suitably mounted on one side of a block frame 45, the base 46, of which is bolted to the top of the tank near one side thereof as shown in Fig. 17. Upon the shaft 34, at a point between the hand wheel and the dial is formed a circular or ring-like enlargement 47, the opposite side edges 48 and 49, of which are oppositely beveled and attached and projecting from the indicator hand are a series of cam arms for longitudinally shifting the shaft 34. As shown these cam arms comprise a central cam 50, which is provided with a beveled surface 51, which engages and coöperates with the beveled side edge 48 of the enlargement 47, to shift the shaft 34 outwardly and thus disengage the gear wheel 35 from the gear wheel 36 on the short vertical shaft and two curved side cam arms 52 and 53, which extend practically opposite to each other and generally in a transverse direction with respect to the indicator hand. These side cam arms both have bevel surfaces 54, which engage with the bevel side edges 49, of the enlargement to shift the longitudinal shaft 34, inwardly and bring the bevel gear wheel 35 in meshing engagement with the bevel gear 36. These indicating points 55, 56 and 57 are arranged on the dial in a curved row and are adapted to coöperate with the indicator hand to indicate the adjusted position of the agitators and the strainer tubes.

Referring to the diagrammatic views Figs. 21 to 24 on Sheet 4 of the drawings, it will be noted that the adjusted position of the strainer mechanism may be instantly noted from the dial. In Fig. 21, the indicator hand is turned to point to the right hand side point 56, the bevel gears are in mesh and the strainer tubes are operated from a mashing position to a straining or grain removing position. In Fig. 22, the indicator hand is turned to point to the left hand side point 57, the bevel gears are in mesh and the strainer tubes are operated from a straining or grain removing position to a mashing position. In Fig. 23, the indicator hand is turned to the central or neutral point 55, the gears are out of mesh and the strainer tubes are in a straining and grain removing position. In the last Fig. 24, the indicator hand is in a central or neutral position at the neutral point 55, the gears are out of mesh and the strainer tubes are in a mashing position.

Besides the indicator points 55, 56 and 57, I have arranged a position indicating mechanism in the rear of the dial 38, which serves to designate the adjustment of the agitators and strainer tubes. This mechanism as shown in Figs. 18, 19 and 20, consists of two cranks 58 and 59 mounted on the dial so as to rock thereon and adapted to close an opening 60 in the dial when in one position. The cranks 59 are connected by a series of thin connecting rods 61—62 and 63 and are shifted by the movement of the indicating hand 42. The various positions of the indicating mechanism are shown in Figs. 21 to 24 inclusive.

The straining tubes are used at the close of the mashing to retain the grains and while the tubes and stirrers may be altered in their position while in motion it is not advisable to so alter them. Usually they are adjusted when the machine is at rest.

The index arm is manually moved and controls the rocking of the shaft 34.

While I have illustrated and described a preferred form of construction for carrying my invention into effect, this is capable of a wide range of variation, alteration, modification and change without departing from the spirit of my invention. I therefore, do not wish to be limited to the construction herein shown and described but desire to avail myself of all such variations, alterations, modifications and changes as fairly fall within the scope of the appended claims or may be construed to be within the scope thereof by invoking the doctrine of equivalents.

What I claim as my invention and desire to secure by Letters Patent is:—

1. In a machine of the class described, the combination of a tank, straining and agitating mechanism in said tank, means for adjusting said straining and agitating mechanism and controlling mechanism for said adjusting means.

2. In a machine of the class described, the combination of a tank, straining and agitating mechanism in said tank, means for adjusting said straining and agitating mechanism, and controlling mechanism for said adjusting means, located on the exterior of the tank.

3. In a machine of the class described, the combination of a tank, straining and agitating mechanism in said tank, means for adjusting said straining and agitating mechanism including a shaft rotatably mounted in a fixed position, a movable shaft shiftable relatively to the fixed shaft, and a controller for shifting said movable shaft.

4. In a machine of the class described, the combination of a tank, straining and agitating mechanism in said tank, means for adjusting said straining and agitating mechanism including a shaft rotatably mounted in a fixed position, a longitudinally movable shaft shiftable relatively to the fixed shaft, and a controller for shifting said movable shaft.

5. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts, and adapted to be engaged or disengaged by the shifting of said horizontal shaft, and means for shifting said horizontal shaft.

6. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, and a controller having means for shifting said horizontal shaft.

7. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, and a controller having cam means for shifting said horizontal shaft.

8. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts, and adapted to be engaged or disengaged by the shifting of said horizontal shaft, and a controller having a series of cams for shifting said horizontal shaft.

9. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, an enlargement on said horizontal shaft, and a controller having means coöperating with said enlargement for shifting said horizontal shaft.

10. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, an enlargement on said horizontal shaft, and a controller having cam means coöperating with said enlargement for shifting said horizontal shaft.

11. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, an enlargement on said horizontal shaft, and a controller having a series of arms coöperating with said enlargement for shifting said horizontal shaft.

12. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, an enlargement on said horizontal shaft, and a controller having a cam arm coöperating with said enlargement for shifting said horizontal shaft.

13. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, an enlargement on said horizontal shaft, and a controller having a cam arm coöperating with said enlargement for shifting said horizontal shaft, and another cam arm for shifting said shaft in an opposite direction.

14. In a machine of the class described, the combination of a tank, straining and agitating mechanism in said tank, means for adjusting said straining and agitating mechanism including a vertical shaft rotatably mounted in a fixed position, a longitudinally shiftable horizontal shaft, gears respectively mounted on said shafts and adapted to be engaged or disengaged by the shifting of said horizontal shaft, a central cam arm for shifting said shaft in one direction and two oppositely extending lateral cam arms for shifting the shaft in the opposite direction.

15. In a machine of the class described, a mash agitating mechanism in said tank, means for adjusting said agitating mechanism, and cam controlling means for said adjusting mechanism.

16. In a machine of the class described, a tank agitating mechanism in said tank, means for adjusting said agitating mechanism including a longitudinally movable shaft, and controlling mechanism for said adjusting means having an indicator hand and shaft shifting cams connected to said indicator hand.

17. In a machine of the class described, a tank agitating mechanism in said tank, means for adjusting said agitating mechanism including a longitudinally movable shaft, and controlling mechanism for said adjusting means having a dial, an indicator hand pivotally mounted in said dial and shaft shifting cams connected to said indicator hand.

18. In a machine of the class described, a tank agitating mechanism in said tank, means for adjusting said agitating mechanism including a longitudinally movable shaft, and controlling mechanism for said adjusting means having a dial, an indicator hand pivotally mounted in said dial and shaft shifting cams connected to said indicator hand, and adapted to move the shaft in either direction.

19. In a machine of the class described, a tank, a central vertical shaft in said tank, revoluble agitating mechanism arranged within the tank and mounted on the shaft, means for adjusting said agitating mechanism including a short vertical shaft on one side of the central shaft having a gear wheel, a horizontal shaft having a gear wheel adapted to mesh with the gear wheel on the short vertical shaft, and controlling mechanism for shifting the horizontal shaft into or out of meshing position relatively to the short vertical shaft.

20. In a machine of the class described, a tank, a central vertical shaft in said tank, revoluble agitating mechanism arranged within the tank and mounted on the shaft, means for adjusting said agitating mechanism including a short vertical shaft on one side of the central shaft having a gear wheel, a horizontal shaft having a gear wheel adapted to mesh with the gear wheel on the short vertical shaft, and cam mechanism for shifting the horizontal shaft into or out of meshing position relatively to the short vertical shaft.

21. In a machine of the class described, the combination with revoluble agitating mechanism, of means for adjusting said agitating mechanism, and a controller for said adjusting means.

22. In a machine of the class described, agitating mechanism comprising a frame having arms, a series of blade agitators hung pendant from said arms and strainer tubes suspended at intervals between said blade agitators.

23. In a machine of the class described, agitating mechanism comprising a frame, having arms, a series of blade agitators hung pendant from said arms, and strainer tubes suspended at intervals between said blade agitators, each of said strainer tubes having a removable perforated bottom.

24. In a machine of the class described, agitating mechanism comprising a frame having arms, a series of blade agitators hung pendant from said arms and strainer tubes suspended at intervals between said blade agitators, each of said strainer tubes having a removable perforated bottom detachably secured to said bottom by a bayonet lock.

25. In a machine of the class described, agitating mechanism comprising a frame having arms, a series of blade agitators hung pendant from said arms and strainer tubes suspended at intervals between said blade agitators, each of said strainer tubes having a removable perforated bottom and a movable top cover.

26. In a machine of the class described, agitating mechanism comprising a frame having arms, a series of blade agitators hung pendant from said arms and strainer tubes suspended at intervals between said blade agitators, each of said strainer tubes having a removable top cover provided with a supporting sleeve at one side thereof and a pivot pin for securing said supporting sleeve to the frame arm.

27. In a machine of the class described, agitating mechanism comprising a frame having arms, a series of blade agitators hung pendant from said arms and strainer tubes suspended at intervals between said blade agitators, each of said strainer tubes having a movable top cover.

28. In a machine of the class described, agitating mechanism comprising a frame having arms, a series of blade agitators hung pendant from said arms and strainer tubes suspended at intervals between said blade agitators, each of said strainer tubes having a movable top cover and means for shifting said cover.

29. In a machine of the class described, agitating mechanism comprising a frame having an arm, a strainer tube suspended from said arm, and a movable top cover for said tube.

30. In a machine of the class described, agitating mechanism comprising a frame having an arm, a strainer tube suspended from said arm, and a removable bottom for said tube.

31. In a machine of the class described, agitating mechanism comprising a frame having an arm, a strainer tube suspended from said arm, and a top and bottom for said tube, both of which are movable relatively to said tube.

32. In a machine of the class described, agitating mechanism comprising a frame having an arm, a strainer tube suspended from said arm, and a top and bottom for said tube one of which is detachable from the tube and the other of which is movable relatively to the tube.

33. In a machine of the class described, agitating mechanism comprising a frame having an arm and a strainer tube suspended from said arm and provided with movable top and bottom covers.

34. In a machine of the class described, agitating mechanism, means for adjusting said agitating mechanism, a controller for said adjusting means, and position indicating means operatively connected to the controller.

35. In a machine of the class described, agitating mechanism, means for adjusting said agitating mechanism, a controller for said adjusting means, and position indicating means operatively connected to the controller, and including pivoted indicating arms and a rod connecting said arms.

In testimony whereof I have affixed my signature.

Chicago March 11, 1916.

ANDREAS R. KELLER.